(12) United States Patent
Yomo et al.

(10) Patent No.: US 7,924,748 B2
(45) Date of Patent: Apr. 12, 2011

(54) METHOD AND SYSTEM FOR CONTROLLING POWER IN A COMMUNICATION SYSTEM

(75) Inventors: Hiroyuki Yomo, Aalborg (DK); Ragnar Viôir Reynisson, Aalborg (DK); Petar Popovski, Aalborg (DK); Elisabeth De Carbalho, Aalborg (DK); Jung-Soo Woo, Suwon-si (KR); Deok-Ki Kim, Seongnam-si (KR); Ho-Kyu Choi, Seongnam-si (KR); Young-Kwon Cho, Suwon-si (KR); Dong-Seek Park, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 620 days.

(21) Appl. No.: 11/649,184

(22) Filed: Jan. 3, 2007

(65) Prior Publication Data

US 2007/0230375 A1 Oct. 4, 2007

(30) Foreign Application Priority Data

Jan. 2, 2006 (KR) .......................... 10-2006-0000288

(51) Int. Cl.
*H04L 5/14* (2006.01)
(52) U.S. Cl. ........................................................ 370/276
(58) Field of Classification Search .................. 370/276, 370/280, 281, 330, 328, 338; 455/115.3
See application file for complete search history.

(56) References Cited

U.S. PATENT DOCUMENTS

| | | | |
|---|---|---|---|
| 6,728,233 B1 * | 4/2004 | Park et al. ...................... 370/342 |
| 2002/0173277 A1 | 11/2002 | Takao et al. | |
| 2004/0087328 A1 * | 5/2004 | Ronkainen ..................... 455/522 |
| 2007/0060183 A1 * | 3/2007 | Moulsley et al. ............. 455/522 |

FOREIGN PATENT DOCUMENTS

| | | |
|---|---|---|
| EP | 1443794 A2 * | 8/2004 |
| JP | 2002-2345014 | 11/2002 |
| KR | 1999-0031485 | 5/1999 |

* cited by examiner

*Primary Examiner* — Derrick W Ferris
*Assistant Examiner* — Mang Yeung
(74) *Attorney, Agent, or Firm* — The Farrell Law Firm, P.C.

(57) ABSTRACT

A method is provided for controlling power in a communication system. The power control method includes allocating a first data transmission region and a second data transmission region corresponding to a first communication scheme and second communication scheme; providing a communication service to a receiver through the first data transmission region, and receiving power control information from the receiver through the second data transmission region while providing the communication service; and adjusting a level of transmission power used for providing the communication service according to the received power control information, and providing the communication service to the receiver using the adjusted transmission power.

35 Claims, 10 Drawing Sheets

METHOD AND SYSTEM FOR CONTROLLING POWER IN A COMMUNICATION SYSTEM

PRIORITY

This application claims priority under 35 U.S.C. §119(a) to an application filed in the Korean Intellectual Property Office on Jan. 2, 2006 and assigned Serial No. 2006-288, the contents of which are incorporated herein by reference.

BACKGROUND OF THE INVENTION

1. Field of the Invention

The present invention relates generally to a communication system, and in particular, to a method and system for controlling power in a communication system using a hybrid duplexing scheme.

2. Description of the Related Art

The next generation communication system focuses on supporting a voice service as well as multimedia services having various traffic characteristics, such as the broadcasting and the real-time videoconference. Therefore, in order to efficiently provide the services having the various characteristics, there is a need for a duplexing scheme that considers asymmetry and continuity of uplink/downlink transmission according to service characteristics.

Additionally, the next generation wireless communication system should enable variable asymmetrical services that efficiently provide multimedia traffics, and should also have a characteristic capable of providing high-speed data transmission with high reliability. The term "asymmetrical service" refers to a service in which a DownLink (DL) and an UpLink (UL) are different in data rate. The multimedia traffics need a higher data rate in the DL rather than the UL, because a Mobile Station (MS) having both mobility and fixity receives multimedia services. Preferably, a ratio of the asymmetry is subject to change.

The duplexing scheme used in the wireless communication system can be classified into a Time Division Duplexing (TDD) scheme and a Frequency Division Duplexing (FDD) scheme. The TDD scheme divides the same frequency band into time intervals and alternately switches transmission intervals and reception intervals, thereby implementing bi-directional communication. The FDD scheme divides a given frequency band into transmission bands and reception bands, thereby performing bi-directional communication.

In the TDD-based communication system, a Base Station (BS) can allocate some or all of its available time slots to MSs, and asymmetrical communication is possible through variable allocation of the time slots. However, in the TDD-based communication system, if a radius of a cell managed by the BS increases, a guard time between transmission/reception time slots increases due to a round-trip delay, decreasing transmission efficiency. Therefore, in a large-cell radius communication environment, or in the macro-cell communication environment, it is not preferable to use the TDD scheme. Further, in the TDD-based communication system, because the asymmetry ratio of each cell is not constant in the multi-cell environment, considerable frequency interference occurs between MSs located in the boundary between neighbor cells.

However, in the FDD-based communication system, time delay for transmission/reception does not occur because transmission frequency bands are separated from reception frequency bands. Therefore, there is no round-trip delay caused by the time delay, thus, the FDD-based communication system is suitable for the large-cell radius environment like the macro-cell environment. However, the FDD-based communication system is not suitable for duplexing for variable asymmetrical transmission because the transmission frequency bands and the reception frequency bands are fixed.

Accordingly, there is a demand for research into hybrid duplexing schemes that can obtain the merits of both of the TDD scheme and the FDD scheme by mixing the two duplexing schemes taking into account various communication environments and traffic characteristics of the next generation communication system. In order to meet the demand, a communication system using a hybrid duplexing scheme has been proposed, and the communication system using the hybrid duplexing scheme operates based on the TDD scheme in the micro-cell environment, and operates based on the FDD scheme in the macro-cell environment.

However, when the communication system using the hybrid duplexing scheme operates based on one of the TDD scheme and the FDD scheme according to communication environment, a level of the power that the BS transmits to MSs varies according to the communication environment. The variation in the transmission power according to the communication environment may decrease system performance, which is considerable, particularly when the communication system operates based on the TDD scheme.

SUMMARY OF THE INVENTION

An object of the present invention is to address at least the problems and/or disadvantages and to provide at least the advantages described herein below. Accordingly, an aspect of the present invention is to provide a method and system for controlling power in a communication system.

Another aspect of the present invention is to provide a method and system for controlling power according to communication environment in a communication system using a hybrid duplexing scheme.

According to an aspect of the present invention, there is provided a method for controlling power in a communication system. The power control method includes allocating a first data transmission region and a second data transmission region corresponding to a first communication scheme and second communication scheme; providing a communication service to a receiver through the first data transmission region, and receiving power control information from the receiver through the second data transmission region while providing the communication service; and adjusting a level of transmission power used for providing the communication service according to the received power control information, and providing the communication service to the receiver using the adjusted transmission power.

According to another aspect of the present invention, there is provided a method for controlling power in a communication system. The power control method includes receiving a first data transmission region and a second data transmission region corresponding to a first communication scheme and a second communication schemes, allocated from a transmitter, and measuring the strength of a received signal in the first data transmission region while receiving a communication service from the transmitter through the first data transmission region; generating power control information according to the measured strength of the received signal, and transmitting the generated power control information to the transmitter through the second data transmission region; and receiving the communication service through the first data transmission region with transmission power, a level of which is controlled according to the transmitted power control information.

According to further another aspect of the present invention, there is provided a system for controlling power in a communication system. The system includes a transmitter for allocating a first data transmission region and a second data transmission region corresponding to a first communication scheme and a second communication scheme, providing a communication service to a receiver through the first data transmission region, receiving power control information from the receiver through the second data transmission region while providing the communication service, adjusting a level of transmission power used for providing the communication service according to the received power control information, and providing the communication service to the receiver using the adjusted transmission power; and a receiver for receiving the first data transmission region and the second data transmission region allocated from the transmitter, measuring strength of a received signal in the first data transmission region while receiving the communication service from the transmitter through the first data transmission region, generating power control information according to the measured strength of the received signal, transmitting the generated power control information to the transmitter through the second data transmission region, and receiving the communication service through the first data transmission region with transmission power, a level of which is controlled according to the transmitted power control information.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EXEMPLARY EMBODIMENTS

Exemplary embodiments of the present invention will now be described in detail with reference to the annexed drawings.

In the drawings, the same or similar elements are denoted by the same reference numerals even though they are depicted in different drawings. In the following description, a detailed description of known functions and configurations incorporated herein has been omitted for clarity and conciseness.

The present invention provides a method and system for controlling power in a communication system. In addition, the present invention provides a method and system for controlling power in a communication system using a combined scheme of a first communication scheme and a second communication scheme, i.e. using a hybrid duplexing scheme. The present invention provides a power control method and system for improving performance of the communication system by rapidly controlling power according to a communication environment in the communication system using the hybrid duplexing scheme. In addition, the present invention provides a power control method and system in which a receiver, for example, a Mobile Station (MS), having both mobility and fixity, transmits power control information to a transmitter, for example, a Base Station (BS) while receiving a communication service from the transmitter, and the transmitter adjusts a level of transmission power used for providing the communication service to the receiver. The power control information is information on a channel status that varies according to the communication environment, while the receiver receives the communication service from the transmitter, namely, power control information generated according to the strength of a signal received from the transmitter, and is transmitted to the transmitter through a previously allocated resource.

In the communication system according to the present invention, the transmitter allocates data transmission regions, for example, a first data transmission region and a second data transmission region, for the first communication scheme and the second communication scheme, respectively, and provides the communication service to the receiver through the first data transmission region among the allocated data transmission regions. While receiving the communication service through the first data transmission region, the receiver generates power control information according to the channel status, and transmits the generated power control information to the transmitter through the second data transmission region. Upon receipt of the power control information, the transmitter controls transmission power according to the received power control information, and provides the communication service to the receiver through the first data transmission region using the controlled transmission power.

Further, in the present invention, an MS having both mobility and fixity measures a channel status between the MS and a BS providing a communication service to the MS according to a communication environment of the communication system and transmits power control information corresponding to the measured channel status to the BS through a previously allocated feedback channel, and the BS controls a level of transmission power used for providing the communication service to the MS. Particularly, in the following description, the present invention provides a method and system for controlling transmission power in a communication system using a hybrid duplexing scheme. Although a Time Division Duplexing (TDD) scheme and a Frequency Division Duplexing (FDD) scheme will be used herein as the first communication scheme and the second communication scheme for the hybrid duplexing scheme, respectively, the present invention can be applied to every communication system using the hybrid duplexing scheme, as well as to every general communication system.

Figure 1:
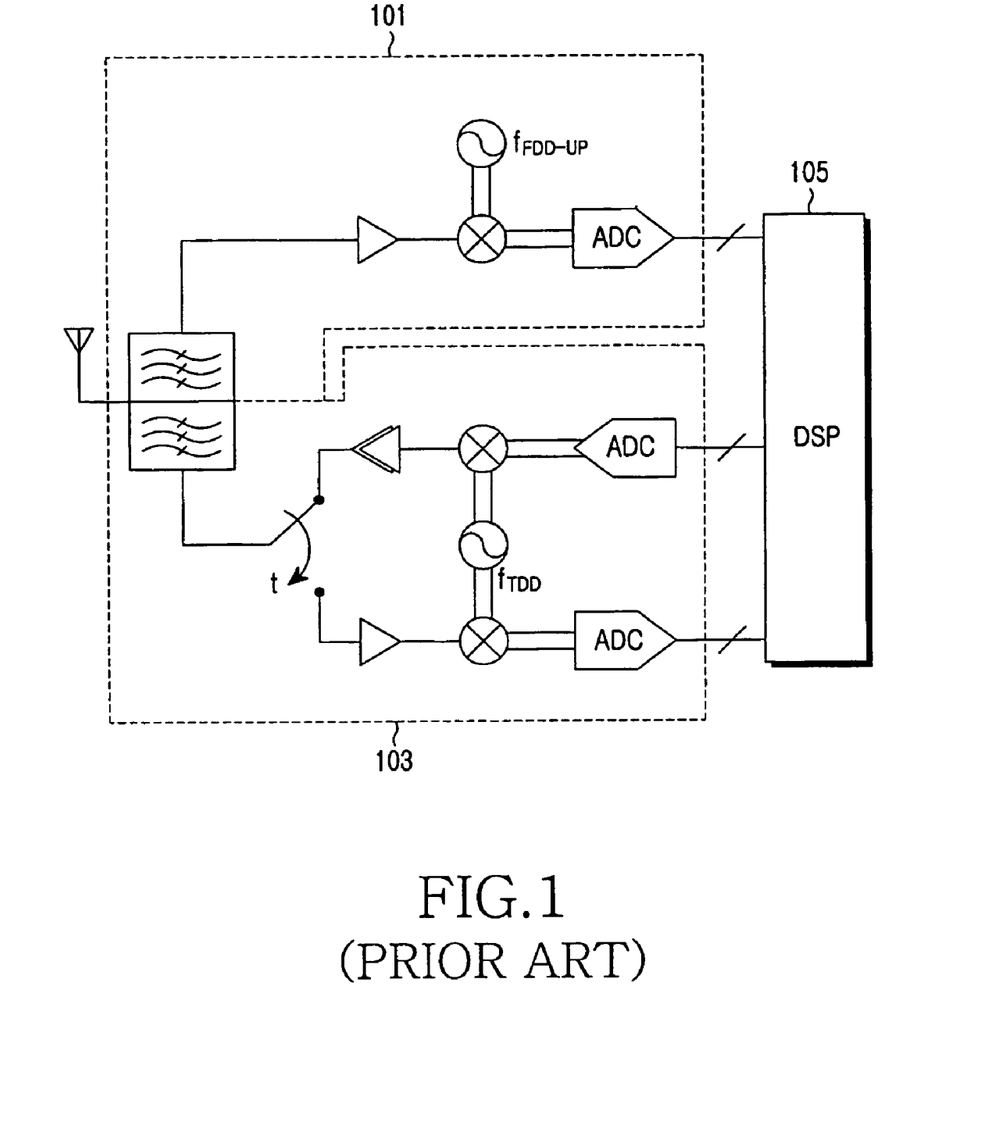
FIG. 1 is a diagram illustrating a structure of a transceiver of a Base Station (BS) in a communication system using a hybrid multiplexing scheme.

FIG. 1 is a diagram illustrating a structure of a transceiver of a BS in a communication system using a hybrid multiplexing scheme.

Referring to FIG. 1, the BS transceiver is divided into an UpLink (UL) FDD region processor 101 and a TDD region processor 103, where the TDD region processor 103 is divided into a DownLink (DL) TDD region processor (not shown) and a UL TDD region processor (not shown). A combined block of the DL TDD region processor and the UL TDD region processor operates as a DL TDD region processor or a UL TDD region processor by switching every predetermined time. A Digital Signal Processor (DSP) 105 processes Transmission/reception signals of the UL FDD region processor 101 and the TDD region processor 103. If the BS transceiver receives a signal from an MS via an antenna, the received signal is delivered to the DSP 105 through the UL FDD region processor 101 and the UL TDD region processor, and if a signal to be transmitted to the MS is output from the DSP 105, the output signal is transmitted to the MS through the DL TDD region processor.

Figure 2:
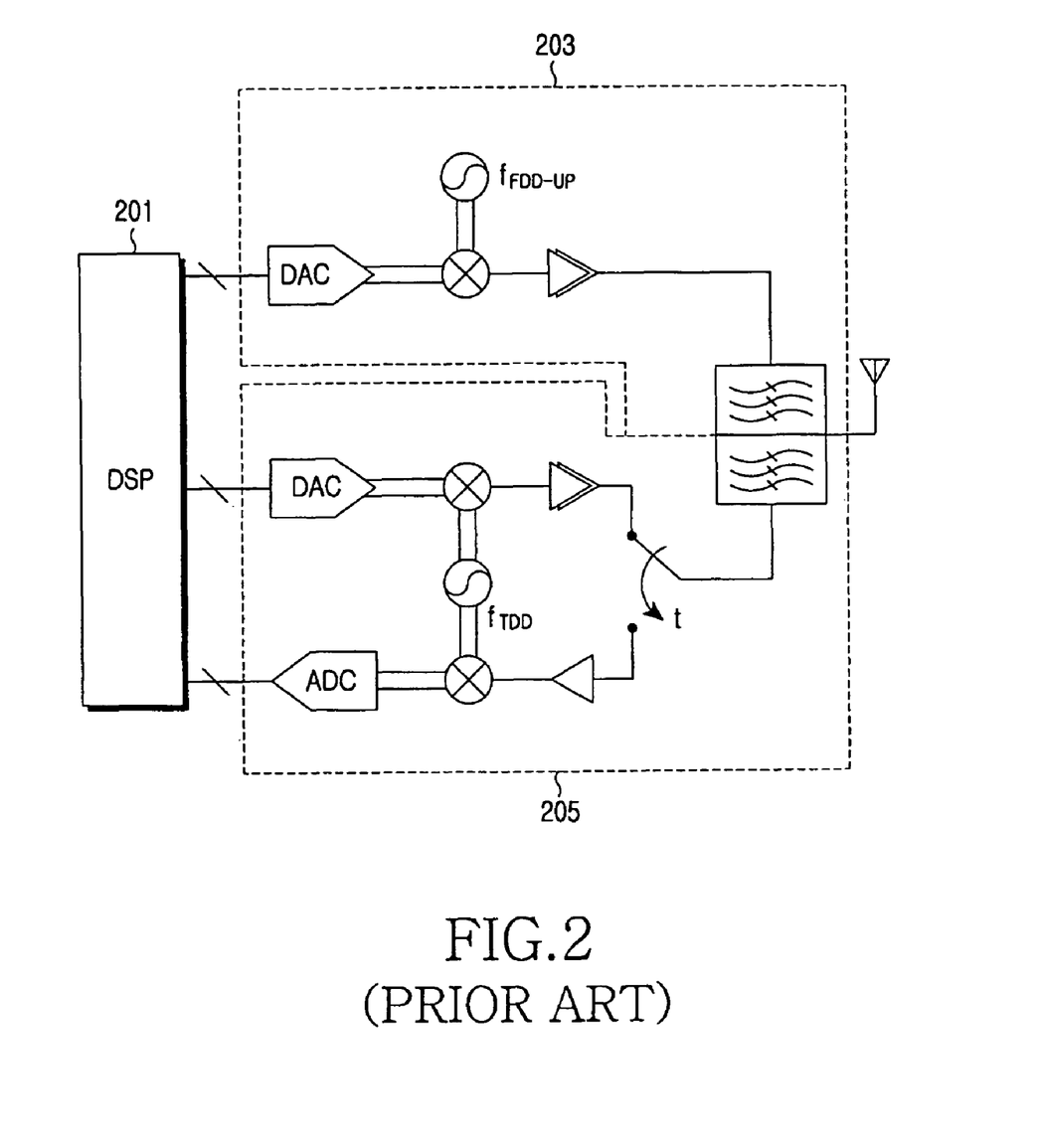
FIG. 2 is a diagram illustrating a structure of a transceiver of a Mobile Station (MS) in a communication system using a hybrid duplexing scheme.

FIG. 2 is a diagram illustrating a structure of a transceiver of an MS in a communication system using a hybrid duplexing scheme.

Referring to FIG. 2, the MS transceiver is divided into a UL FDD region processor 203 and a TDD region processor 205, where the TDD region processor 205 is divided into a DL TDD region processor and a UL TDD region processor A combined block of the DL TDD region processor and the UL TDD region processor operates as one of a DL TDD region processor and a UL TDD region processor by switching every predetermined time. A DSP 201 processes Transmission/reception signals of the UL FDD region processor 203 and the TDD region processor 205. If a signal is received from a BS via an antenna, the received signal is delivered to the DSP 201 through the DL TDD region processor, and if a signal to be transmitted to the BS is output from the DSP 201, the output signal is transmitted to the BS through the UL FDD region processor 203, the UL TDD region processor, and the antenna.

Figure 3:
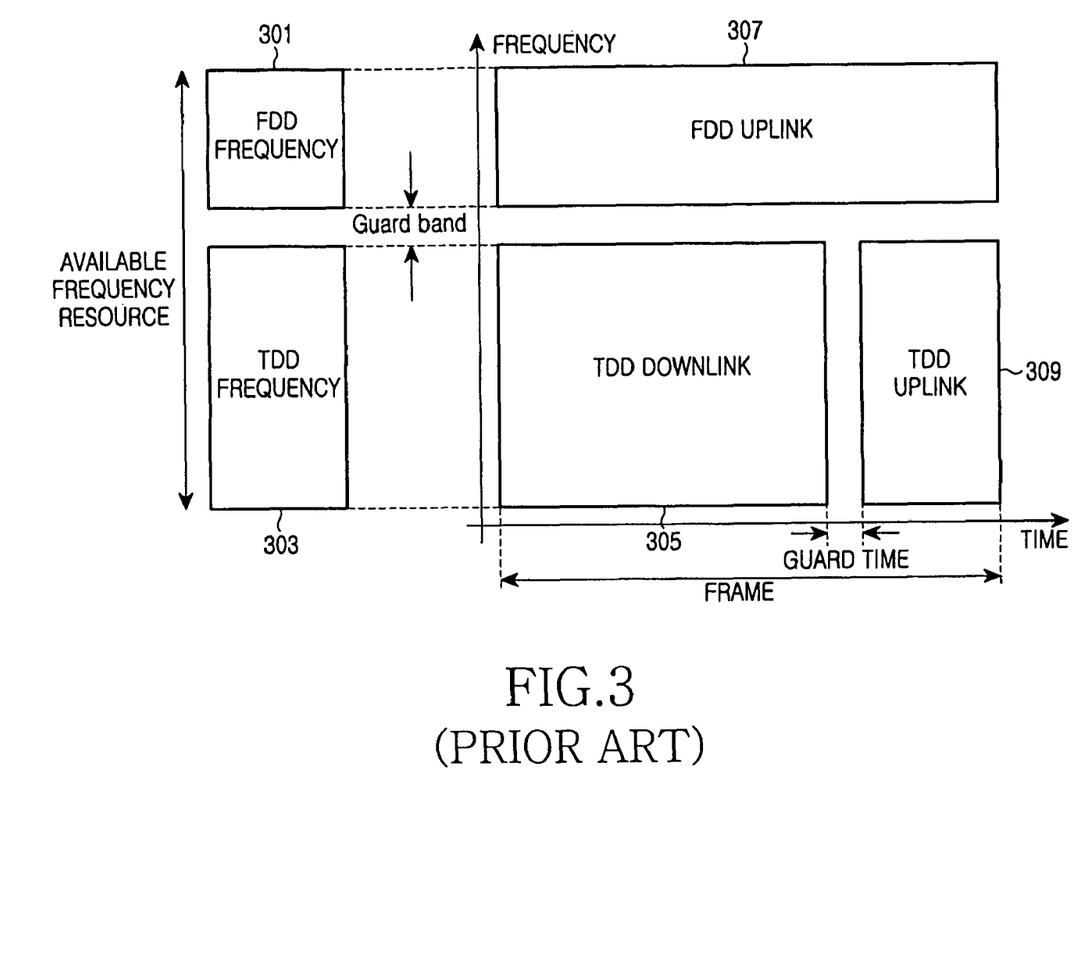
FIG. 3 is a diagram illustrating a frame structure in a communication system using a hybrid duplexing scheme.

FIG. 3 is a diagram illustrating a frame structure in a communication system using a hybrid duplexing scheme. Referring to FIG. 3, the frame has a 2-dimensional structure according to a frequency region and a time region. The frequency region that is available in the communication system is divided into an FDD frequency region 301 and a TDD frequency region 303, and there is a guard band between the FDD frequency region 301 and the TDD frequency region 303. The time region is divided into a TDD DL region 305 and a TDD UL region 309, and there is a guard time between the TDD DL region 305 and the TDD UL region 309.

The communication system using the hybrid duplexing scheme having the above frame structure allows a BS to efficiently allocate resources of each frame to MSs. Simply, the BS divides a frequency region of the frame having a 2-dimensional structure by the frequency region and a time region into two resources, i.e. two channels, allocates one channel for the TDD DL region 305 and the TDD UL region 309 by applying the TDD scheme, and allocates the other channel for an FDD UL region 307 by applying the FDD scheme. In addition, the communication system divides the time region of the frame into two intervals, allocates one interval for the TDD DL region 305, and allocates the other interval for the TDD UL region 309. An FDD UL region 307 is allocated over all time intervals.

Figure 4:
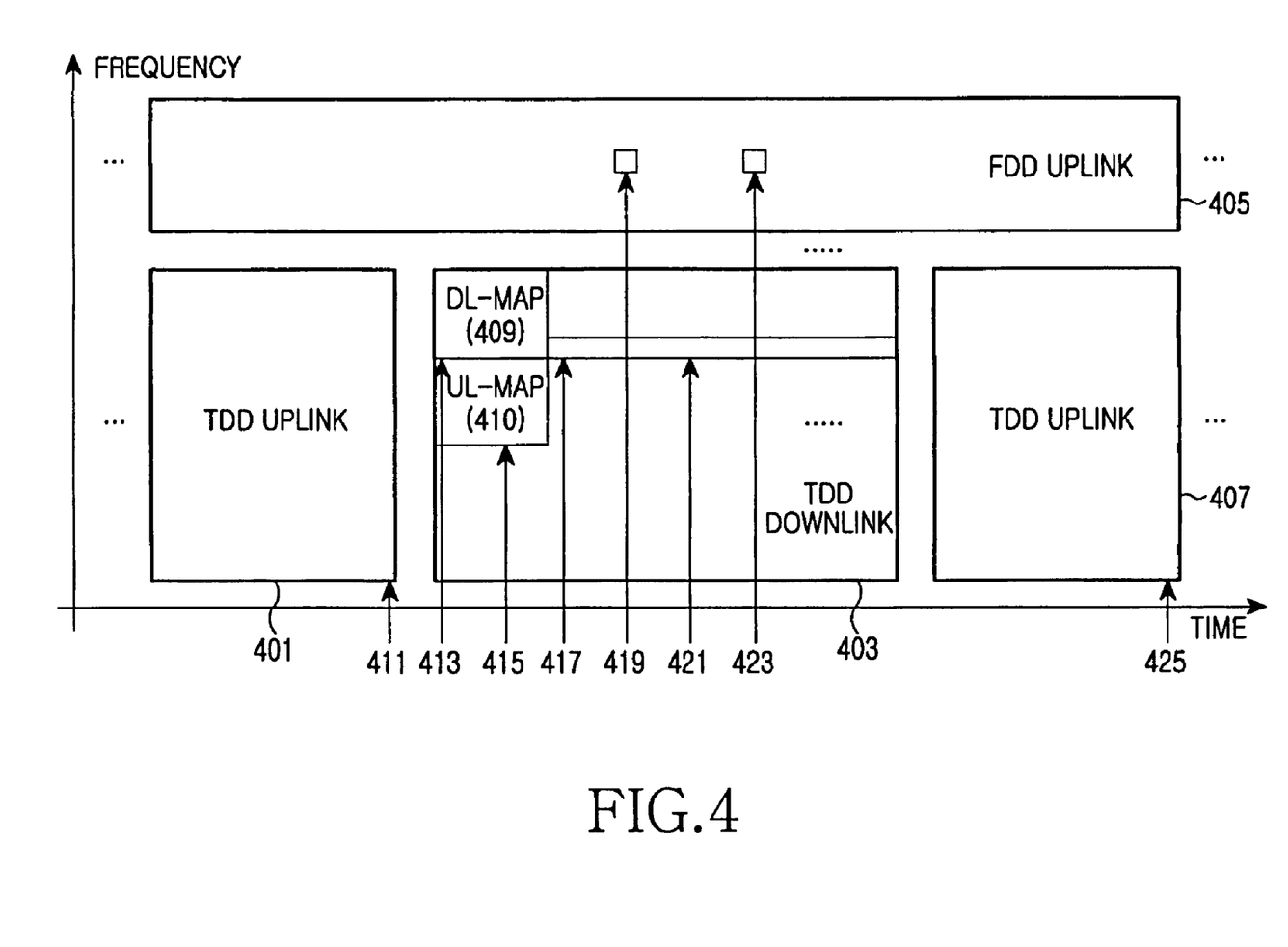
FIG. 4 is a diagram illustrating a frame structure in a communication system using a hybrid duplexing scheme according to the present invention.

FIG. 4 is a diagram illustrating a frame structure in a communication system using a hybrid duplexing scheme according to the present invention. Referring to FIG. 4, the frame has a 2-dimensoinal structure by a frequency region and a time region. The frequency region available in the communication system is divided into two regions, i.e. an FDD UL region 405, which is a FDD region, and a TDD region, and the TDD region includes TDD UL regions 401 and 407 and a TDD DL region 403, obtained by dividing the time region. There are guard times between the FDD region and the TDD regions, and between the TDD regions 401, 403 and 407.

The communication system using the hybrid duplexing scheme having the above frame structure allows a BS to efficiently allocate resources of each frame to MSs. In other words, the communication system divides a frequency region of the frame having a 2-dimensional structure by the frequency region and a time region into two resources, i.e. two channels, allocates one channel for the TDD DL region 403 and the TDD UL regions 401 and 407 by applying the TDD scheme, and allocates the other channel for the FDD UL region 405 by applying the FDD scheme. In addition, the communication system divides the time region of the frame into three intervals, allocates one interval for the TDD DL region 403, and allocates the other two intervals for the TDD UL regions 401 and 407. The FDD UL region 405 is allocated over all the time intervals.

After the BS of the communication system allocates resources of each frame to MSs in this manner, the BS transmits resource allocation information of the frame to the MSs through a MAP message. More specifically, the BS of the communication system receives Channel Status Information (CSI) of MSs transmitted from the MSs through the TDD UL region 401. The BS decodes the received CSI of the MSs and performs a scheduling process of allocating resources to the MSs depending on the CSI. That is, the BS performs a scheduling process of allocating resources of each frame to the MSs according to the CSIs of the MSs, received from the MSs through the TDD UL region 401 (Step 411).

Thereafter, the BS includes the scheduling information of the MSs in a DL-MAP region 409 of the TDD DL region 403 (Step 413). In addition, the BS includes feedback channel information to be used by the MSs for feeding back to the BS the status information between the MSs and the BS, and various control information, for example, the CSIs and power control information, in a UL-MAP region 410 of the TDD DL region 403 (Step 415). The feedback channel information included in the UL-MAP region 410 is feedback channel information of the MSs, allocated in the FDD UL region 405 and the TDD UL region 407 of each frame. In other words, the MSs transmit their status information and various control information to the BS through the feedback channel allocated in the FDD UL region 405 and the TDD UL region 407 according to the feedback channel information included in the UL-MAP region 410 of the TDD DL region 403.

After allocating resources of each frame to the MSs through scheduling according to the CSIs of the MSs in this manner, the BS provides the communication service to the MSs through the allocated resources, i.e. TDD DL region 403. While the BS provides the communication service to the MSs, especially while the communication system using the hybrid duplexing scheme operates according to the TDD scheme, i.e. while the BS transmits downlink data to the MSs based on the TDD scheme, the channel statuses between the BS and the MSs may vary due to a change in the communication environment. If the channel statuses between the BS and the MSs vary, even though the BS transmits downlink data to the MSs at the same transmission power, the MSs receiving the downlink data may vary in strength, for example, Signal-to-Interference and Noise Ratio (SINR), of received signals.

The MSs measure strength, for example, SINR, of signals received at the TDD DL region 403 because the variation in the received signal strength of the MSs receiving the downlink data may cause a decrease in performance of the communication system (Step 417). Thereafter, the MSs transmit power control information corresponding to the measured SINR to the BS through the feedback channel that is allocated in the FDD UL region 405 according to the feedback channel information included in the UL-MAP region 410 of the TDD DL region 403 (Step 419). In addition, the MSs repeatedly re-measure SINR of the received signals until they receive all of the downlink data from the BS (Step 421), and re-transmit power control information corresponding to the re-measured SINR to the BS over the feedback channel allocated in the FDD UL region 405 according to the feedback channel information included in the UL-MAP region 410 of the TDD DL region 403 (Step 423).

After completely transmitting the downlink data, the BS receives uplink data and status information of the MSs and various control information, for example, the CSI and power control information, from the MSs through the TDD UL region 407, and performs a scheduling process of allocating resources of each frame to the MSs according to the received status information of the MSs and the received various control information (Step 425).

In the communication system using the hybrid duplexing scheme according to the present invention, the BS performs scheduling according to the feedback information provided from the MSs, for example, CSIs and power control information, and allocates resources of each frame to the MSs through a first data transmission region, a second data transmission region and a third data transmission region according to the scheduling result. Thereafter, the BS transmits downlink data to the MSs through the allocated resource, i.e. the TDD DL region 403 as the first data transmission region, and the MSs measure strength of received signals while receiving the downlink data from the BS, and transmit power control information corresponding to the measured received signal strength to the BS through the FDD UL region 405 as the second data transmission region. In this manner, the BS controls levels of transmission power to the MSs. If the BS completes reception of downlink data through the first data transmission region, the MSs transmit desired uplink data and feedback information including their CSI and power control information to the BS through the third data transmission region. Herein, the third data transmission region serves as a feedback channel over which the feedback information is transmitted.

Figure 5:
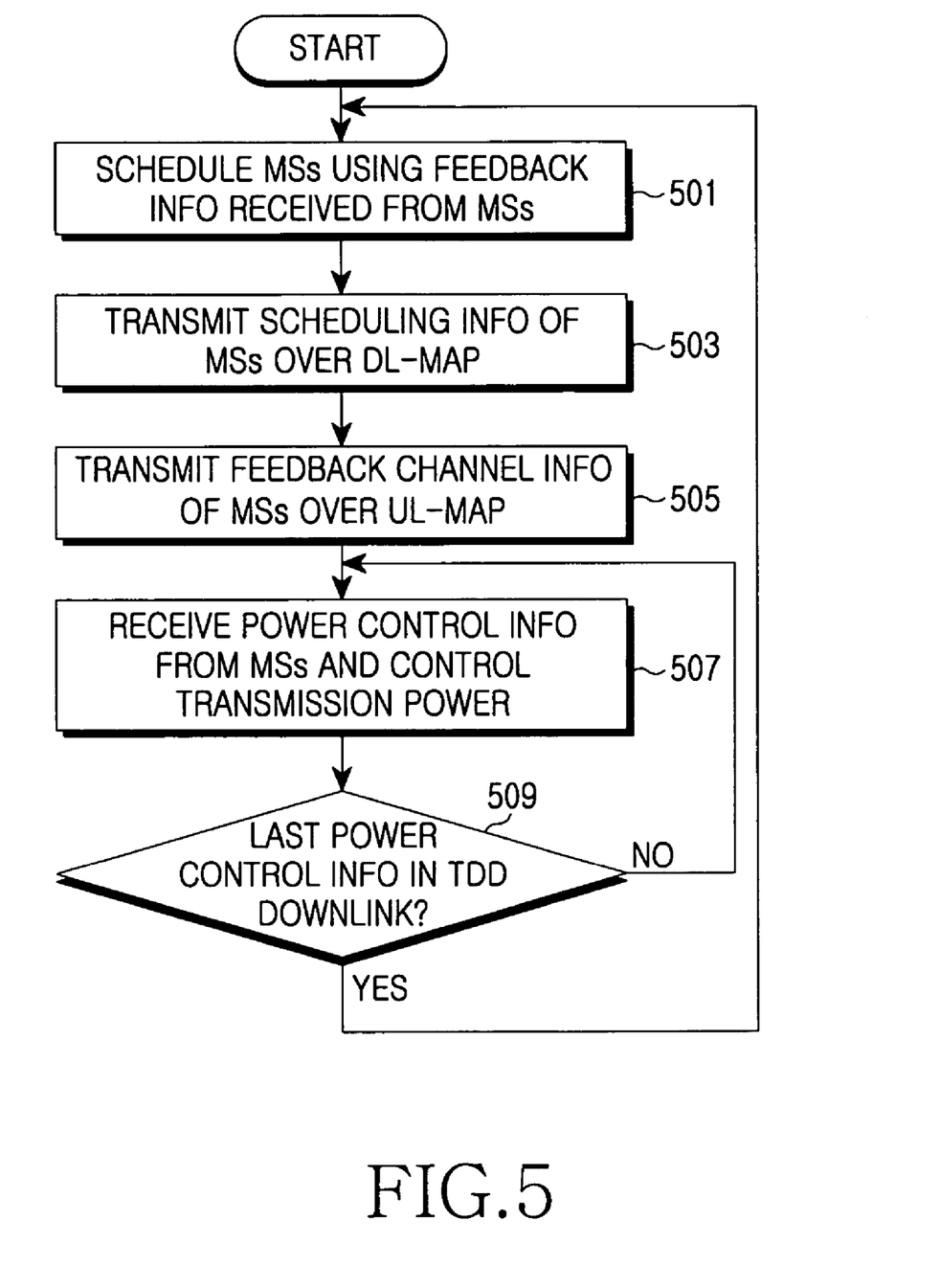
FIG. 5 is a flow chart illustrating an operation of a BS in a communication system using a hybrid duplexing scheme according to the present invention.

FIG. 5 is a flow chart illustrating an operation of a BS in a communication system using a hybrid duplexing scheme according to the present invention.

Referring to FIG. 5, in step 501, the BS of the communication system schedules MSs using their feedback information, for example, CSI and various control information, received from the MSs through an uplink data transmission region. In other words, as described above, the BS decodes CSI of the MSs, received through an uplink frame, specifically, received through a TDD UL region of each frame, and performs a scheduling process of allocating resources of each frame to the MSs according to the decoded CSI.

Thereafter, in step 503, the BS transmits the scheduling information of the MSs to the MSs through a DL-MAP region of a TDD DL region. In step 505, the BS transmits the feedback channel information to be used by the MSs for feeding back to the BS their CSI and various control information, for example, power control information, to the MSs through a UL-MAP region of the TDD DL region. If the BS allocates resources of each frame to the MSs through the scheduling according to the CSI of the MSs, the BS provides a communication service to the MSs through the allocated resources.

In step 507, if the BS receives power control information through the feedback channel allocated in the FDD UL region of each frame from the MSs while providing the communication service to the MSs, i.e. while transmitting downlink data to the MSs, the BS controls levels of transmission power used for transmission of downlink data to the MSs according to the received power control information. Thereafter, in step 509, the BS determines whether the power control information received from the MSs is the last power control information in the TDD DL region. In other words, the BS determines whether the received power control information is the power control information that the MSs transmitted after they received all of the downlink data from the BS, i.e. whether CSI and various control information are received through the feedback channel of the TDD UL region. If it is determined that the received power control information is not the last power control information, the BS proceeds to step 507 and controls transmission power according to the received power control information. However, if it is determined that the received power control information is the last power control information, the BS proceeds to step 501 and performs scheduling.

Figure 6:
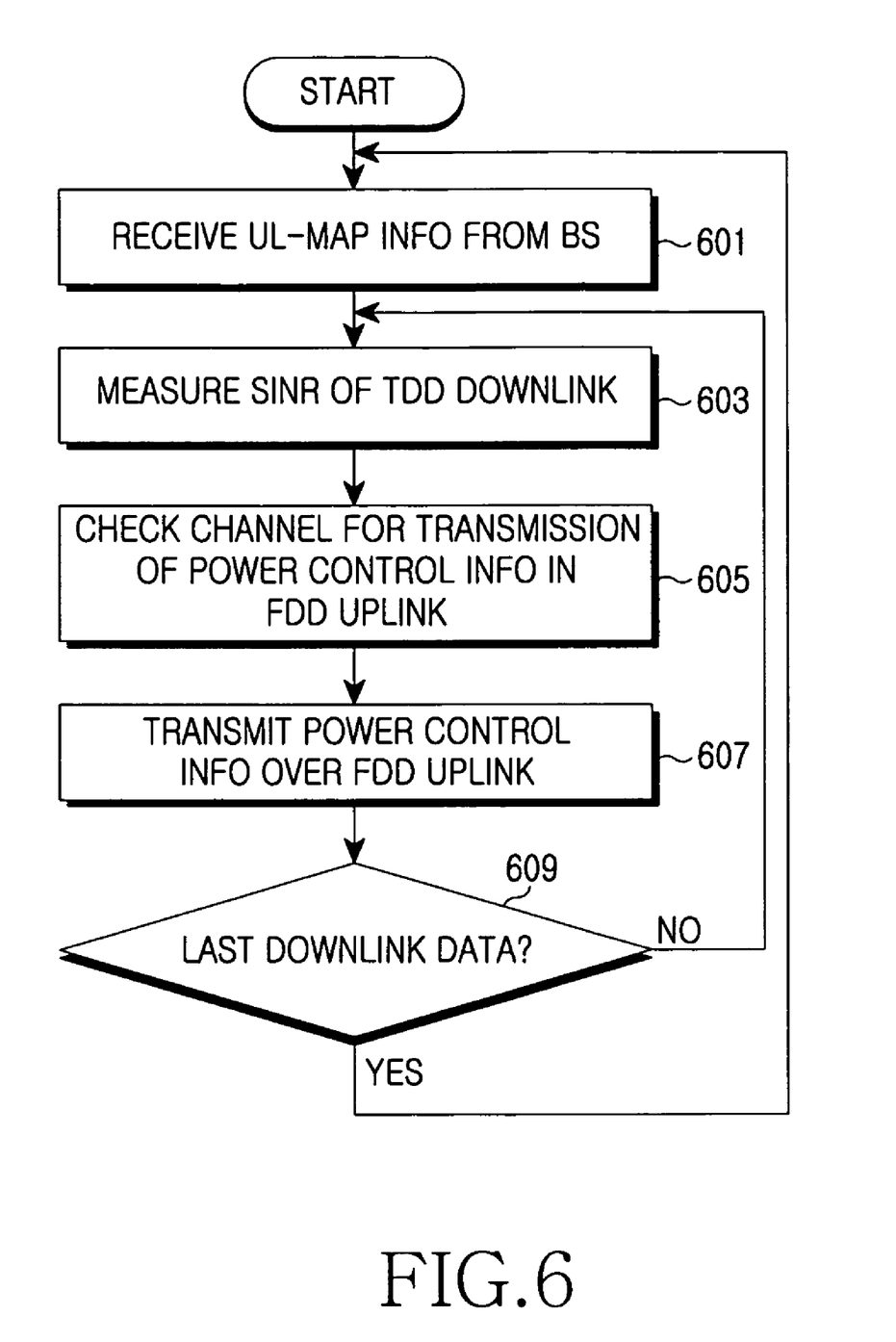
FIG. 6 is a flow chart illustrating an operation of a Mobile Station (MS) in a communication system using a hybrid duplexing scheme according to the present invention.

FIG. 6 is a flow chart illustrating an operation of an MS in a communication system using a hybrid duplexing scheme according to the present invention.

Referring to FIG. 6, in step 601, if the MS of the communication system transmits feedback information including its CSI and various control information to a BS, the MS receives resource of each frame, which the BS has allocated by performing scheduling according to the transmitted feedback information, recognizes the scheduling information by receiving DL-MAP information through a TDD DL region of each frame, allocated from the BS, and receives UL-MAP information through the TDD DL region. Thereafter, in step 603, the MS receives downlink data from the BS through the allocated resource, i.e. the TDD DL region, and measures strength of the received signal, for example, SINR of the TDD DL region, while receiving the downlink data. Simply, if the BS transmits downlink data through the resource allocated in the TDD DL region of each resource-allocated frame, the MS measures SINR of the TDD DL region while receiving the downlink data.

In step 605, the MS determines a feedback channel of the FDD UL region of each frame, included in the UL-MAP information, i.e. a channel for transmitting, to the BS, power control information corresponding to the SINR measured in step 603. Next, in step 607, the MS transmits the power control information to the BS through the resource allocated in the FDD UL region, i.e. the determined feedback channel. Thereafter, in step 609, the MS determines whether the downlink data received through the TDD DL region is the last downlink data. In other words, the MS determines whether it has completely received the downlink data from the BS. If it is determined that the received downlink data is the last downlink data, the MS transmits feedback information including its CSI and various control information to the BS, and then proceeds to step 601. However, if it is determined that the received downlink data is not the last downlink data, the MS proceeds to step 605 and measures the SINR.

Figure 7:
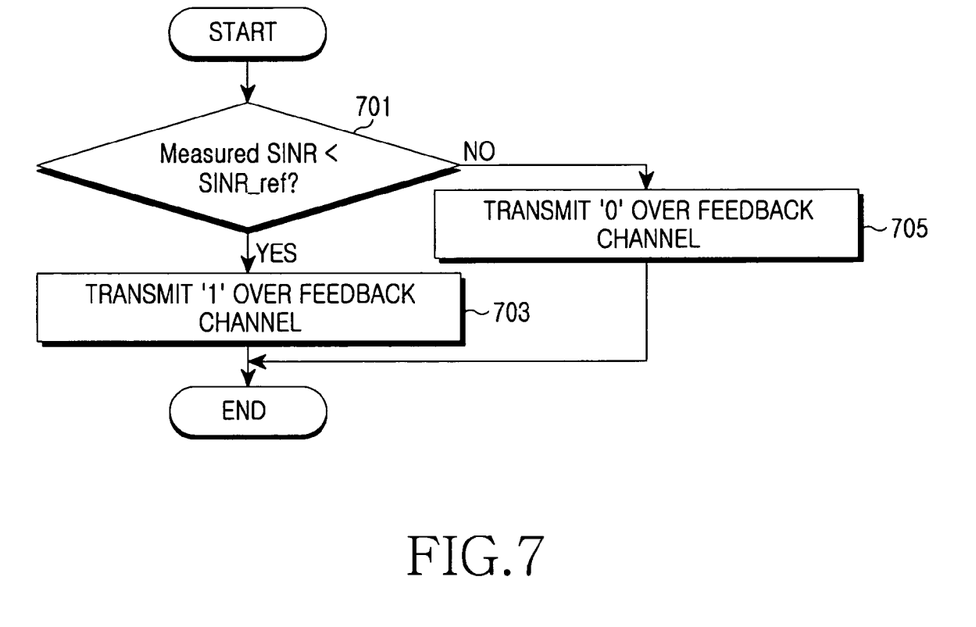
FIG. 7 is a flow chart illustrating a preferred operation of a Mobile Station (MS) in a communication system using a hybrid duplexing scheme according to the present invention.

FIG. 7 is a diagram illustrating a preferred operation of an MS in a communication system using a hybrid duplexing scheme according to the present invention. Herein, FIG. 7 is a flow chart illustrating an operation of an MS according to the present invention, in which the MS transmits 1-bit power control information over a feedback channel, and FIG. 8 is a flow chart illustrating an operation of a BS according to the present invention, in which the BS receives 1-bit power control information transmitted by the MS.

Referring to FIG. 7, in step 701, the MS of the communication system measures strength of a received signal, for example, SINR of a received signal, while receiving downlink data over a resource allocated from a BS, and compares the measured SINR with a reference SINR (SINR_ref) that the user has previously set according to the communication system and the communication environment. If the measured SINR is less than the reference SINR as a result of the comparison in step 701, the MS proceeds to step 703 where it transmits a power control information value '1' corresponding to the comparison result, i.e. the measured SINR, to the BS over a feedback channel. On the contrary, if the measured SINR is greater than or equal to the reference SINR as a result of the comparison in step 701, the MS proceeds to step 705 where it transmits a power control information value '0' corresponding to the comparison result, i.e. the measured SINR, to the BS over the feedback channel. Herein, in response to the power control information value '1', the BS increases a level of the current transmission power used for transmitting downlink data, and in response to the power control information value '0', the BS decreases the level of the transmission power.

Figure 8:
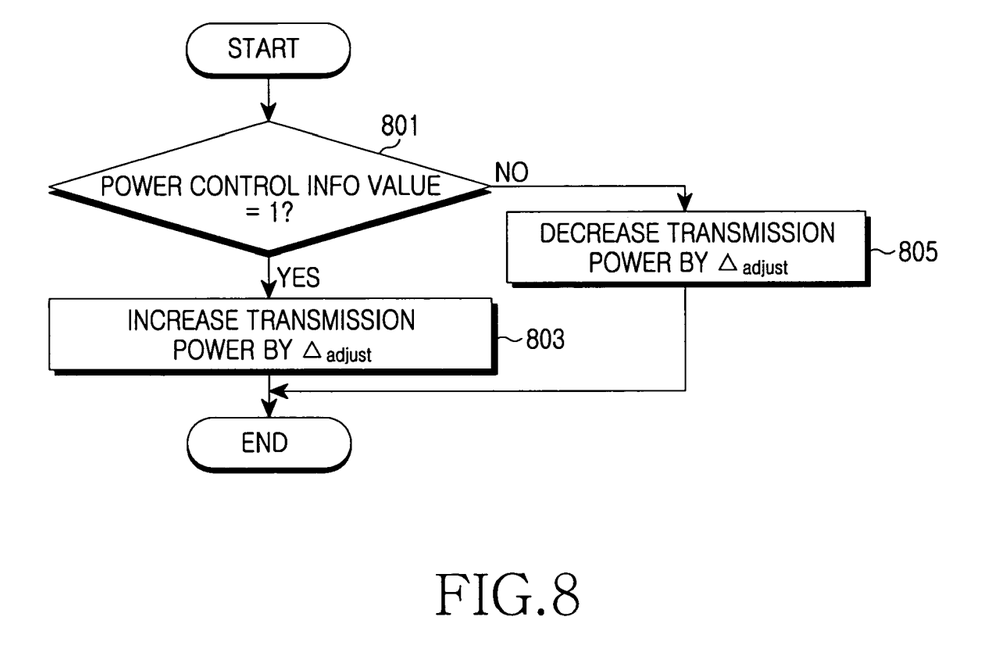
FIG. 8 is a flow chart illustrating a preferred operation of a Base Station (BS) in a communication system using a hybrid duplexing scheme according to the present invention.

FIG. 8 is a flow chart illustrating a preferred operation of a BS in a communication system using a hybrid duplexing scheme according to the present invention. As described above, in the operation of FIG. 8, the BS receives the 1-bit power control information transmitted by the MS.

Referring to FIG. 8, in step 801, if the BS of the communication system receives power control information over a feedback channel from an MS that receives downlink data, while transmitting the downlink data to the MS through an allocated resource, the BS analyzes the received power control information value. If the power control information value analyzed in step 801 is '1', the BS proceeds to step 803 where it increases a level of the transmission power used for transmitting the downlink data by a predetermined level $\Delta_{adjust}$, recognizing that the SINR that the MS has measured is less than a reference SINR according to the power control information value.

Alternatively, if the power control information value analyzed in step 801 is '0', the BS proceeds to step 805 where it decreases a level of the transmission power used for transmitting the downlink data by the predetermined level $\Delta_{adjust}$, recognizing that the SINR that the MS has measured is greater than or equal to the reference SINR according to the power control information value.

Figure 9:
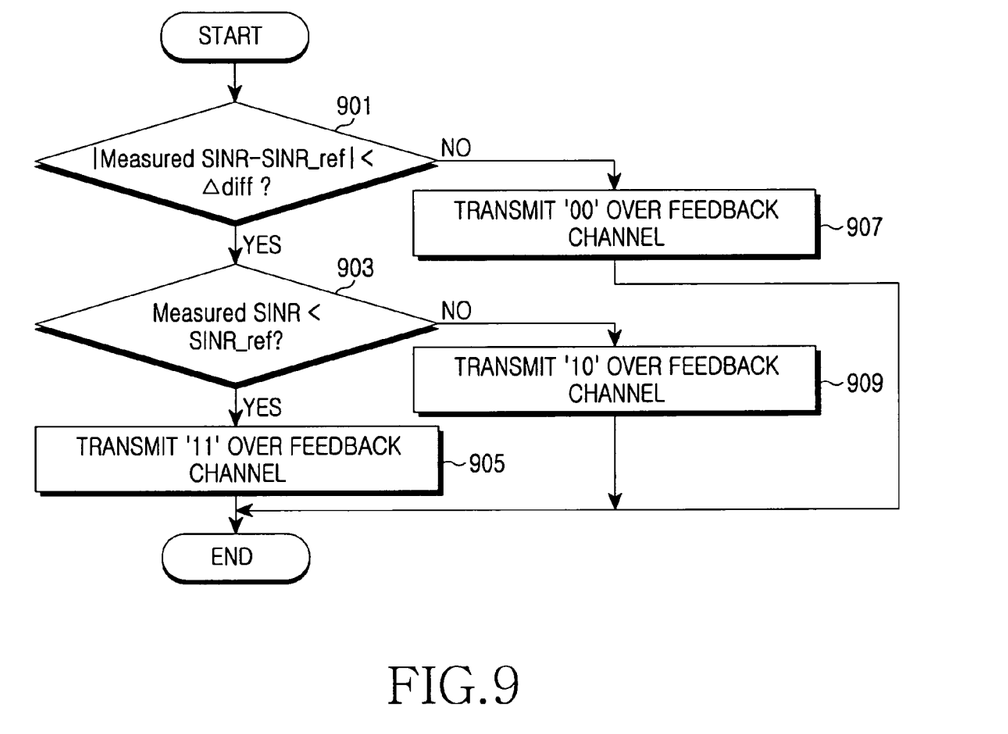
FIG. 9 is a flow chart illustrating another preferred operation of an MS in a communication system using a hybrid duplexing scheme according to the present invention.

FIG. 9 is a flow chart illustrating another preferred operation of an MS in a communication system using a hybrid duplexing scheme according to the present invention. Referring to FIG. 9, the MS transmits 2-bit power control information over a feedback channel, and FIG. 10, which is a flow chart illustrating an operation of a BS according to the present invention, the BS receives 2-bit power control information transmitted by the MS.

Referring to FIG. 9, in step 901, the MS of the communication system measures strength of a received signal, for example, SINR of a received signal, while receiving downlink data over a resource allocated from a BS, and compares a difference between the measured SINR and a reference SINR (SINR_ref) that the user has previously set according to the communication system and communication environment, with a reference range $\Delta$diff. If the difference between the measured SINR and the reference SINR is less than the reference range $\Delta$diff as a result of the comparison in step 901, the MS proceeds to step 907 where it transmits a power control information value '00' corresponding to the comparison result, i.e. the measured SINR, to the BS over a feedback channel. Herein, the difference between the measured SINR and the reference SINR indicates the extent of a change in the SINR that the MS has measured. In response to the power control information value '00' indicating that the change in the measured SINR falls within the reference range $\Delta$diff, the BS maintains the current level of the transmission power used for transmitting the downlink data.

On the contrary, if the difference between the measured SINR and the reference SINR is equal to or greater than the reference range $\Delta$diff as a result of the comparison in step 901, the MS proceeds to step 903 where it compares the measured SINR with the reference SINR. If the measured SINR is less than the reference SINR as a result of the comparison in step 903, the MS proceeds to step 905 where it transmits power control information '11' corresponding to the comparison result, i.e. the measured SINR, to the BS over the feedback channel. However, if the measured SINR is greater than or equal to the reference SINR as a result of the comparison in step 903, the MS proceeds to step 909 where it transmits power control information '10' corresponding to the comparison result, i.e. the measured SINR, to the BS over the feedback channel. Herein, in response to the power control information value '11', the BS increases a level of the current transmission power used for transmitting downlink data, and in response to the power control information value '00', the BS decreases the level of the transmission power.

Figure 10:
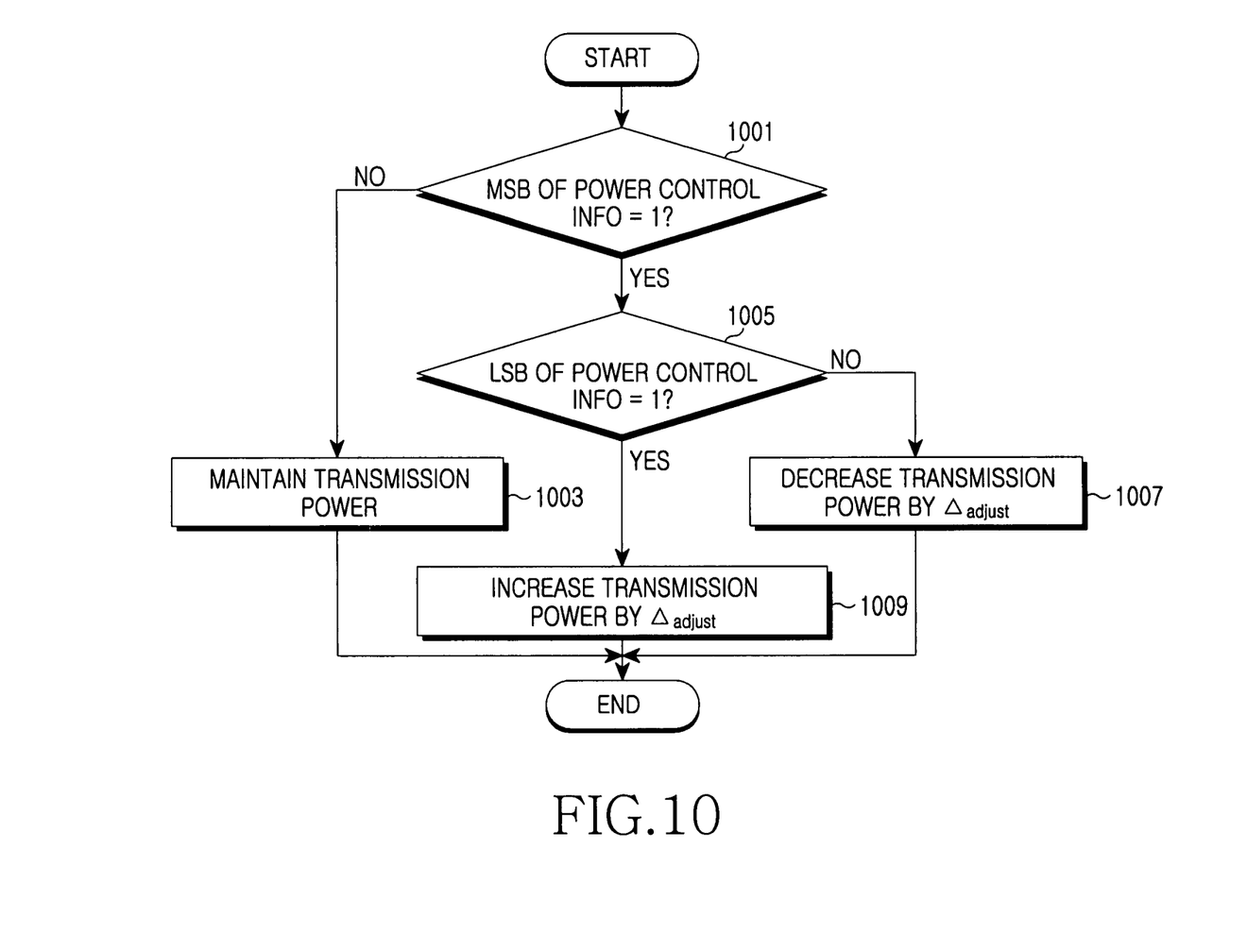
FIG. 10 is a flow chart illustrating another preferred operation of a BS in a communication system using a hybrid duplexing scheme according to the present invention.

FIG. 10 is a flow chart illustrating another preferred operation of a BS in a communication system using a hybrid duplexing scheme according to the present invention. As described above, in the operation of FIG. 10, the BS receives the 2-bit power control information transmitted by the MS.

Referring to FIG. 10, in step 1001, if the BS of the communication system receives 2-bit power control information over a feedback channel from an MS that receives downlink data, while transmitting the downlink data to the MS through an allocated resource, the BS analyzes a Most Significant Bit (MSB) value of the received power control information. If the MSB value of the power control information value analyzed in step 1001 is '0', the BS proceeds to step 1003 where it maintains the current level of the transmission power used for transmitting the downlink data, recognizing that a change in the SINR that the MS has measured falls within the reference range ($\Delta$diff) according to the analyzed MSB value of the power control information value.

Alternatively, if the MSB value of the power control information value analyzed in step 1001 is '1', the BS proceeds to step 1005 where it analyzes a Least Significant Bit (LSB) value of the received power control information. If the LSB value of the power control information analyzed in step 1005 is '1', the BS proceeds to step 1009 where it increases the level of the transmission power used for transmitting the downlink data by a predetermined level $\Delta_{adjust}$, recognizing that the SINR that the MS has measured is less than the reference SINR according to the LSB value of the power control information. However, if the LSB value of the power control information analyzed in step 1005 is '0', the BS proceeds to step 1007 where it decreases the level of the transmission power used for transmitting the downlink data by the predetermined level $\Delta_{adjust}$, recognizing that the SINR that the MS has measured is greater than or equal to the reference SINR according to the LSB value of the power control information.

As can be understood from the foregoing description, in the communication system using a hybrid duplexing scheme, an MS transmits power control information to a BS while receiving a communication service from the BS, so as to rapidly control transmission power of the BS, thereby contributing to improvement of the system performance.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for controlling power by a transmitter of a communication system, the method comprising:
  receiving Channel State Information (CSI) between the transmitter and each of a plurality of receivers from the plurality of receivers through a Time Division Duplexing (TDD) uplink (UL) region;
  allocating, by the transmitter, TDD regions by applying a TDD communication scheme and a Frequency Division Duplexing (FDD) UL region by applying an FDD communication scheme, in accordance with the CSI, the TDD regions including the TDD UL region and a TDD downlink (DL) region;
  providing, by the transmitter, DL data for a communication service to the plurality of receivers through the TDD DL region;
  receiving, by the transmitter, power control information from the receiver through the FDD UL region while providing the DL data for the communication service; and
  adjusting, by the transmitter, a level of transmission power used for providing the DL data for communication service according to the received power control information, and providing the DL data for the communication service to the receiver using the adjusted transmission power;
  wherein receiving power control information comprises allowing, by the transmitter, each of the plurality of receivers to measure a strength of a received signal in the TDD UL region while providing the communication service, and receiving, by the transmitter, power control information generated according to the measured strength of the received signal, the strength of the received signal is a Signal-to-Interference and Noise Ratio (SINR) of the received signal in the TDD UL region.

2. The method of claim 1, wherein the allocation of an FDD UL region comprises allocating a feedback information transmission region for receiving the power control information in the FDD UL region.

3. The method of claim 2, wherein the providing of the DL data for the communication service comprises transmitting allocation information of the FDD UL region including allocation information of the feedback information transmission region, and allocation information of the TDD regions to the plurality of receivers through the TDD DL region.

4. The method of claim 1, wherein the adjustment of the level of transmission power comprises decreasing the level of the transmission power when the SINR is greater than or equal to a threshold, and increasing the level of the transmission power when the SINR is less than the threshold.

5. The method of claim 1, wherein the adjustment of a level of transmission power comprises maintaining the level of the transmission power, when the SINR falls within a threshold range.

6. The method of claim 1, wherein the allocation of the TDD regions and the FDD UL region comprises allocating a second TDD UL region in an interval different from an interval of the TDD regions.

7. The method of claim 6, wherein the allocation of the second TDD UL region comprises allocating a feedback information transmission region for receiving feedback information from the receiver in the second TDD UL region, when the providing of the DL data for the communication service to each of the plurality of receivers through the TDD UL region is completed.

8. The method of claim 7, wherein the providing of the DL data for the communication service comprises transmitting allocation information of the second TDD UL region including allocation information of the feedback information transmission region to the receiver through the TDD UL region.

9. The method of claim 7, further comprising allocating the TDD regions, the FDD UL region, and the second TDD UL region independently according to the feedback information received from the receiver through the feedback information transmission region.

10. The method of claim 9, wherein the feedback information comprises CSI between the transmitter and each of the plurality of receivers, and control information.

11. The method of claim 1, wherein if channel statuses between the transmitter and the plurality of receivers vary, even though the transmitter transmits the DL data to the plurality of receivers using the level of the transmission power, the SINR is changed.

12. The method of claim 1, further comprising:
  receiving, by the transmitter, power control information corresponding to a re-measured strength of the received signal in the TDD UL region until completely providing DL data for the communication service, and
  adjusting, by the transmitter, the level of transmission power according to the power control information corresponding to a re-measured strength of the received signal in the TDD UL region.

13. A method for controlling power by a receiver in a communication system, the method comprising:
  receiving, by the receiver, downlink (DL) data for a communication service though a Time Division Duplexing (TDD) DL region applied a TDD communication scheme, allocated from a transmitter, and measuring, by the receiver, a strength of the received data in a TDD uplink (UL) region applied the TDD communication scheme while receiving the DL data from the transmitter through the TDD DL region;
  generating, by the receiver, power control information according to the measured strength of the received data, and transmitting the generated power control information to the transmitter through a Frequency Division Duplexing (FDD) UL region applied an FDD communication scheme, allocated from the transmitter; and
  receiving, by the receiver, the DL data for the communication service through the TDD DL region with transmission power, a level of which is controlled according to the transmitted power control information;
  wherein measuring the strength of the received data comprises measuring a Signal-to-Interference and Noise Ratio (SINR) of the received data in the TDD DL region through which the DL data for the communication service is received.

14. The method of claim 13, wherein the transmission of the generated power control information to the transmitter through the FDD UL region comprises transmitting the power control information through a feedback information transmission region allocated in the FDD UL region.

15. The method of claim 14, wherein the reception of the DL data for the communication service comprises receiving allocation information of the FDD UL region including allocation information of the feedback information transmission region, and allocation information of the TDD DL region and the TDD UL region through the TDD DL region.

16. The method of claim 13, wherein the reception of the communication service through the TDD DL region with transmission power, a level of which is controlled according to the transmitted power control information comprises receiving the communication service with transmission power, a level of which is decreased, when the measured SINR is greater than or equal to a threshold, and receiving the communication service with transmission power, a level of which is increased, when the measured SINR is less than to the threshold.

17. The method of claim 13, wherein the reception of the communication service through the TDD DL region with transmission power, a level of which is controlled according to the transmitted power control information comprises receiving the communication service with transmission power, a level of which remains unchanged, when the measured SINR falls within a threshold range.

18. The method of claim 13, further comprising receiving allocation information of a second TDD UL region allocated from the transmitter in an interval different from an interval of the TDD UL region corresponding to the TDD communication scheme, and transmitting feedback information to the transmitter through a feedback information transmission region allocated in the second TDD UL region, when the reception of the DL data for the communication service from the transmitter through the TDD DL region is completed.

19. The method of claim 18, wherein the reception of the communication service comprises receiving allocation information of the second TDD UL region including allocation information of the feedback information transmission region through the TDD UL region.

20. The method of claim 18, further comprising receiving the TDD UL region, the TDD DL region, the FDD UL region, and the second TDD UL region that are allocated independently according to the feedback information transmitted to the transmitter through the feedback information transmission region.

21. The method of claim 20, wherein the feedback information comprises Channel Status Information (CSI) between the transmitter and the receiver, and control information.

22. The method of claim 13, wherein if channel statuses between the transmitter and the receiver vary, even though the transmitter transmits the DL data to the receiver using the level of the transmission power, the SINR is changed.

23. The method of claim 13, further comprising:
re-measuring, by the receiver, strength of the received signal in the TDD UL region until completely providing DL data for the communication service, and
transmitting, by the receiver, power control information corresponding to a re-measured strength of the received signal in the TDD UL region.

24. A system for controlling power in a communication system, the system comprising:
a transmitter for Channel State Information (CSI) between the transmitter and a receiver from the receiver through a Time Division Duplexing (TDD) uplink (UL) region, allocating TDD regions by applying a TDD communication scheme and a Frequency Division Duplexing (FDD) UL region by applying an FDD communication scheme, in accordance with the CSI, the TDD regions including the TDD UL region and a TDD downlink (DL) region, providing DL data for a communication service to a receiver through the TDD DL region, receiving power control information from the receiver through the FDD UL region while providing the DL data for the communication service, adjusting a level of transmission power used for providing the DL data for the communication service according to the received power control information, and providing the DL data for the communication service to the receiver using the adjusted transmission power; and
the receiver for receiving the DL data for the communication service through the TDD DL region allocated from the transmitter, measuring strength of received data in the TDD DL region while receiving the DL data from the transmitter through the TDD DL region, generating power control information according to the measured strength of the received data, transmitting the generated power control information to the transmitter through the FDD UL region, and receiving the DL data for the communication service through the TDD DL region with transmission power, a level of which is controlled according to the transmitted power control information;
wherein the receiver measures the strength of the received data by measuring a Signal-to-Interference and Noise Ratio (SINR) of the received data in the TDD DL region through which the DL data for the communication service is received.

25. The system of claim 24, wherein the transmitter allocates a feedback information transmission region for receiving the power control information in the FDD UL region.

26. The system of claim 25, wherein the transmitter transmits allocation information of the FDD UL region including allocation information of the feedback information transmission region, and allocation information of the TDD DL to the receiver through the TDD DL region.

27. The system of claim 24, wherein the transmitter decreases the level of the transmission power when the measured SINR is greater than or equal to a threshold, and increases the level of the transmission power when the measured SINR is less than the threshold.

28. The system of claim 24, wherein the transmitter maintains the level of the transmission power, when the measured SINR falls within a threshold range.

29. The system of claim 24, wherein the transmitter allocates a second TDD UL region in an interval different from an interval of the TDD UL region.

30. The system of claim 29, wherein the transmitter allocates a feedback information transmission region for receiving feedback information from the receiver in the second TDD UL region, when the providing of the DL data for the communication service to the receiver through the TDD UL region is completed.

31. The system of claim 30, wherein the transmitter transmits the second TDD UL region allocation information including allocation information of the feedback information transmission region to the receiver through the TDD UL region.

32. The system of claim 30, wherein the transmitter allocates the TDD regions, the FDD UL region, and the second TDD UL region independently according to the feedback information received from the receiver through the feedback information transmission region.

33. The system of claim 32, wherein the feedback information comprises CSI between the transmitter and the receiver, and control information.

34. The method of claim 24, wherein if channel statuses between the transmitter and the receiver vary, even though the transmitter transmits the DL data to the receiver using the level of the transmission power, the SINR is changed.

35. The method of claim 24, wherein the transmitter receives power control information corresponding to a re-measured strength of the received signal in the TDD UL region until completely providing DL data for the communication service, and adjusts the level of transmission power according to the power control information corresponding to a re-measured strength of the received signal in the TDD UL region.

* * * * *